United States Patent
Yamamoto et al.

(10) Patent No.: US 7,852,036 B2
(45) Date of Patent: Dec. 14, 2010

(54) DISK PLAYBACK APPARATUS AND STEPPING-MOTOR CONTROL APPARATUS

(75) Inventors: Hiromichi Yamamoto, Iwaki (JP); Keisuke Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 377 days.

(21) Appl. No.: 12/100,190

(22) Filed: Apr. 9, 2008

(65) Prior Publication Data

US 2008/0297096 A1  Dec. 4, 2008

(30) Foreign Application Priority Data

May 30, 2007  (JP)  ............................. 2007-142980

(51) Int. Cl.
*G05B 19/40* (2006.01)

(52) U.S. Cl. ........................ 318/685; 318/670; 318/560; 369/47.1; 369/47.36

(58) Field of Classification Search ................. 318/685, 318/671, 560; 369/47.1, 47.36, 47.38
See application file for complete search history.

(56) References Cited

U.S. PATENT DOCUMENTS 6,445,649 B1 * 9/2002 Saito et al. ................. 369/30.1
6,804,176 B1   10/2004 Komazaki
7,085,200 B2 * 8/2006 Okada et al. ................ 369/30.1
7,106,668 B2 * 9/2006 Okada et al. ............. 369/30.27

FOREIGN PATENT DOCUMENTS

JP  2001-76448   3/2001
JP  2004-139656  5/2004

* cited by examiner

*Primary Examiner*—Bentsu Ro
*Assistant Examiner*—David S Luo
(74) *Attorney, Agent, or Firm*—Brinks Hofer Gilson & Lione

(57) ABSTRACT

When the magnitude of a traverse signal exceeds a predetermined level, the value of a microstep drive signal is changed by one microstep angle so that the rotation angle of the stepping motor changes in a rotation direction in which the magnitude of the traverse signal decreases. A determination is made as to whether or not the magnitude of the traverse signal becomes a predetermined level or less. When the magnitude of the traverse signal does not become the predetermined level or less, the magnitude of the microstep drive signal is returned to the pre-change value and the value of the microstep drive signal is incremented by an additional microstep angle so that the rotation angle of the stepping motor changes in a rotation direction in which the magnitude of the traverse signal decreases.

20 Claims, 4 Drawing Sheets

DISK PLAYBACK APPARATUS AND STEPPING-MOTOR CONTROL APPARATUS

RELATED APPLICATION

The present application claims priority to Japanese Patent Application Number 2007-142980, filed May 30, 2007, the entirety of which is hereby incorporated by reference.

BACKGROUND OF THE INVENTION

1. Field of the Invention

The present invention relates to a technology for performing microstep driving of a stepping motor used for, for example, feeding the pickup of an optical-disk playback apparatus.

2. Description of the Related Art

Conventionally, a technology for performing microstep driving of a stepping motor used for feeding the pickup of an optical-disk playback apparatus is known (e.g., Japanese Unexamined Patent Application Publication No. 2001-76448). The microstep driving is a driving method for controlling the stepping motor by using, as units, angles obtained by dividing a basic step angle of the stepping motor into multiple angles. Herein, for convenience, the number of angles obtained by dividing the basic step angle is referred to as a "microstep division number" and the angle obtained by dividing the basic step angle by the microstep division number is referred to as a "microstep angle".

Another technology for driving a stepping motor used for feeding the pickup of the optical-disk playback apparatus is known (e.g., Japanese Unexamined Patent Application Publication No. 2004-139656). In this technology, when the value of a drive signal is changed so that the rotation angle of the stepping motor advances by one step angle and the stepping motor does not rotate in response to the change, the value of the drive signal is gradually increased.

For the microstep driving of a stepping motor used for feeding the pickup of an optical-disk playback apparatus, as the microstep division number is increased, the amount of change in a drive signal for changing the rotation angle of the stepping motor by one microstep angle decreases and the change reduces the impact on the rotor of the stepping motor. This makes it difficult to cause the rotation of the rotor of the stepping motor by overcoming the load at the point, even when the value of the drive signal is changed so that the rotation angle of the stepping motor changes by one microstep angle. As a result, a response of the rotation angle of the stepping motor relative to a change in the value of the drive signal deteriorates.

In such a case, when the technology disclosed in Japanese Unexamined Patent Application Publication No. 2004-139656 described above is used to gradually change the value of the drive signal by a predetermined value until the stepping motor rotates, there is a problem. That is, since the impact that a change in the value of the driving signal has on the rotor of the stepping motor at each time is equal, the value of the drive signal needs to be changed by the predetermined value multiple times until the stepping motor rotates, when the impact is not sufficiently strong to start the rotation of the rotor of the stepping motor. As a result, a large amount of time is required until the rotor of the stepping motor rotates and the value of the driving signal increases cumulatively. Thus, during the rotation of the stepping motor, the amount of change in the rotation angle of the stepping motor may become significantly larger than a desired change in the rotation angle. On the other hand, when the predetermined value is sufficiently increased, the stepping motor can be quickly rotated. With this arrangement, however, during the rotation of the stepping motor, the amount of difference between a change in the rotation angle of the stepping motor and a desired change in the rotation angle always becomes large.

Therefore, according to the known technologies, it is difficult to perform servo control of the stepping motor with sufficient accuracy when the microstep division number is increased.

SUMMARY OF THE INVENTION

Accordingly, an object of the present invention is to accurately perform servo control of the stepping motor used for, for example, feeding the pickup of an optical-disk playback apparatus even when the microstep division number is large.

In order to achieve the foregoing object, one embodiment of the present invention provides a disk playback apparatus for playing back a storage-medium disk. The disk playback apparatus includes a pickup that reads a signal from the disk, a stepping motor that moves the pickup in a radial direction of the disk, a drive control unit that performs microstep driving for changing a rotation angle of the stepping motor by changing a value of a drive signal to be supplied to the stepping motor, and a servo control unit that performs tracking servo of the pickup by controlling the drive control unit. When the drive control unit performs the microstep driving in accordance with control of the servo control unit and the stepping motor does not rotate, the drive control unit returns the value of the drive signal to the pre-change value and changes the value of the drive signal by an amount of change that is greater than an amount of change in the drive signal supplied when the stepping motor does not rotate.

When the drive control unit performs the microstep driving in accordance with control of the servo control unit and the stepping motor does not rotate, the drive control unit may repeat returning the value of the drive signal to the pre-change value and changing the value of the microstep drive signal while increasing the amount of change in the value of the drive signal until the stepping motor rotates.

When the drive control unit performs the microstep driving in accordance with control of the servo control unit so that the rotation angle of the stepping motor changes by an amount corresponding to one microstep angle and the stepping motor does not rotate, the drive control unit may return the value of the drive signal to the pre-change value and change the value of the drive signal so that the rotation angle of the stepping motor changes by an amount corresponding to two microstep angles, one microstep angle being obtained by dividing a basic step angle of the stepping motor by the number of microsteps per one basic step of the stepping motor.

When the drive control unit performs the microstep driving in accordance with control of the servo control unit so that the rotation angle of the stepping motor changes by an amount corresponding to one microstep angle and the stepping motor does not rotate, the drive control unit may return the value of the drive signal to the pre-change value and repeat the operation for changing the value of the drive signal so that the rotation angle of the stepping motor changes by an amount corresponding to i microstep angles while incrementing i by one from two until the stepping motor rotates, one microstep angle being obtained by dividing a basic step angle of the stepping motor by the number of microsteps per one basic step of the stepping motor.

According to the disk playback apparatus, when the microstep driving is performed in accordance with control of the servo control unit and the stepping motor does not rotate, the value of the driving signal is temporarily returned to the previous value and the drive signal is changed by the amount of change that is greater than the amount of change in the value of the drive signal supplied when the stepping motor does not rotate. In this processing, when the stepping does not rotate, a greater force than a force applied when the stepping motor does not rotate can be applied to the rotor of the stepping motor. Thus, it is possible to quickly and reliably rotate the stepping motor. Since changing the amount of the drive signal by a greater amount of change, as described above, is performed after the value of the drive signal is returned to the pre-change value, it is possible to reduce the amount of displacement relative to an intended rotation angle of the stepping motor when the stepping motor rotates.

Thus, with the microstep division number being set to a large value, when the stepping motor does not rotate in response to a change in the drive signal and the servo control does not work, the operation can be quickly returned to a state in which appropriate servo control is performed. With this arrangement, it is possible to improve the accuracy of the servo control, with the microstep division number being set to a large value.

In the disk playback apparatus described above, the disk may be an optical disk. Further, in the disk apparatus described above, based on a tracking error signal indicating an amount of tracking error of the pickup, the drive control unit may determine whether or not the stepping motor rotates when the value of the drive signal is changed to change the rotation angle of the stepping motor.

The configuration of the drive control unit in the disk playback apparatus described above is also applicable to a stepping-motor control apparatus for performing servo control of a stepping motor for any apparatus having a stepping motor. With such an arrangement, the stepping-motor control apparatus can perform accurate servo control even when the microstep division number is large.

Thus, in this case, the stepping-motor control apparatus may include the drive control unit and a servo control unit for performing servo control of the stepping motor by controlling the drive control unit. The drive control unit performs microstep driving as described above in accordance with control of the servo control unit. When the stepping motor does not rotate as a result of the microstep driving, the above-described operation when the stepping motor does not rotate is performed.

As described above, according to the present invention, the servo control of the stepping motor used for, for example, feeding the pickup of the optical-disk playback apparatus can be accurately performed even when the microstep division number is large.

DESCRIPTION OF THE PREFERRED EMBODIMENTS

An embodiment of the present invention will now be described with reference to the accompanying drawings.

Figure 1:
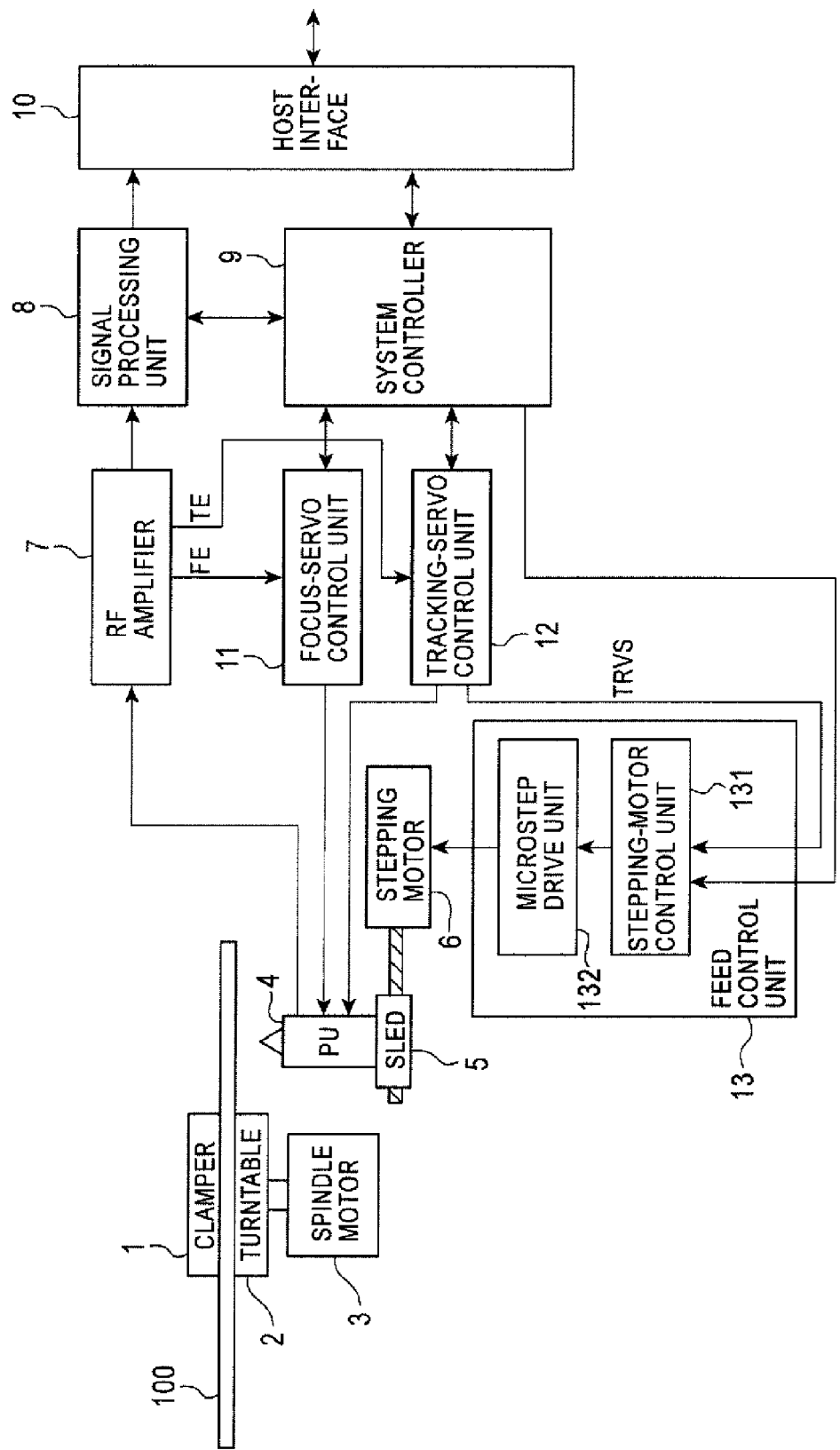
FIG. 1 is a block diagram showing the configuration of an optical-disk drive according to an embodiment of the present invention.

FIG. 1 shows the configuration of an optical-disk drive according to an embodiment of the present invention. As shown in FIG. 1, the optical-disk drive includes a clamper 1, a turntable 2, a spindle motor 3, a pickup (PU) 4, a sled 5, a stepping motor 6, an RF (radio frequency) amplifier 7, a signal processing unit 8, a system controller 9, a host interface 10 connected to a host apparatus, a focus-servo control unit 11, a tracking-servo control unit 12, and a feed control unit 13. The feed control unit 13 includes a stepping-motor control unit 131 and a microstep drive unit 132.

In this configuration, the clamper 1 and the turntable 2 clamp an optical disk 100, such as a DVD (digital versatile disk), loaded into the optical-disk drive, and the spindle motor 3 rotates the optical disk 100 clamped between the clamper 1 and the turntable 2.

The pickup 4 is supported by the sled 5. In conjunction with the rotation of the stepping motor 6, the sled 5 moves in the radial direction of the optical disk 100 while supporting the pickup 4. The feed control unit 13 performs a feed operation for moving the pickup 4 in the radial direction of the optical disk 100 by performing microstep driving for controlling the rotation of the stepping motor 6.

The pickup 4 includes a laser light source, a photoelectric device, an objective lens, a focus actuator, and a tracking actuator. The objective lens focuses light, emitted from the laser light source, on a recording layer of the optical disk 100, and also guides light, reflected from the recording layer of the optical disk 100, to the photoelectric device. The focus actuator moves the objective lens in a direction perpendicular to a signal recording surface of the optical disk 100. The tracking actuator moves the objective lens in the radial direction of the optical disk 100. The photoelectric device of the pickup 4 detects the light reflected from the signal recording surface of the optical disk 100, photoelectrically converts the reflected light, and outputs a detection signal.

The RF amplifier 7 then generates an RF signal from the detection signal output from the pickup 4 and outputs the generated RF signal to the signal processing unit 8. The RF amplifier 7 also generates a focus-error signal (FE) and a tracking-error signal (TE) from the detection signal output from the pickup 4.

The signal processing unit 8 then demodulates data of the RF signal output from the RF amplifier 7, detects and corrects error generated in the demodulated data, plays back data recorded on the optical disk 100, and sends the playback data to the host interface 10.

The system controller 9 controls the above-described units. In accordance with a host command received from the host apparatus via the host interface 10, the system controller 9 performs read processing for playing back data from the optical disk 100, the data being requested by the host command, and transferring the playback data to the host apparatus via the host interface 10.

Based on the focus-error signal (FE), the focus-servo control unit 11 performs focus-servo control for adjusting a focus position of the objective lens on the recording surface of the optical disk 100 by driving the focus actuator of the pickup 4, the focus position being perpendicular to the disk surface of the optical disk 100.

Based on the tracking error signal (TE), the tracking-servo control unit 12 performs tracking-servo control for adjusting, on the track of the optical disk 100, the focus position of the objective lens in the radial direction of the optical disk 100 by controlling the feed operation of the feed control unit 13 and driving the tracking actuator of the pickup 4.

The range in which the tracking actuator can move the focus position of the objective lens in the radial direction of the optical disk 100 is limited to a relatively small area. Thus, during the tracking servo control of the tracking-servo control unit 12, the feed control unit 13 causes the tracking actuator of the pickup 4 to adjust the focus position to an intended track while moving the sled 5 so that the track on which the focus position is to be located is included in the range in which the tracking actuator can adjust the focus position.

In such tracking servo control, the feed control unit 13 causes the movement of the pickup 4 as follows.

That is, the tracking-servo control unit 12 extracts low-frequency components of the tracking-error signal (TE) input from the RF amplifier 7, performs predetermined phase compensation and so on, and outputs a traverse signal TRVS to the feed control unit 13. The traverse signal TRVS indicates a general change in the amount of tracking error, which represents the amount of position displacement of the focus position from the track in the radial direction.

When the magnitude of the input traverse signal TRVS becomes greater than a predetermined level in feed control processing described below, the stepping-motor control unit 131 of the feed control unit 13 causes the microstep drive unit 132 to output, to the stepping motor 6, a drive signal for rotating the stepping motor 6 by an amount corresponding to 1 microstep angle in a rotation direction in which tracking error is cancelled. The predetermined level is assumed to be the level of the traverse signal TRVS when the track position approaches the limit of the range in which the focus position can be adjusted by the tracking actuator. In this case, as the track position approaches the limit of the range in which the focus position can be adjusted by the tracking actuator, the amount of displacement of the focus position from the optical axis of the objective lens becomes larger and the level of traverse signal TRVS increases.

By using the above-described control function of the feed control unit 13 for controlling the stepping motor 6, the system controller 9 controls the rotation of the stepping motor 6 without using the traverse signal TRVS to perform a seek operation and so on for moving a track at which the focus position is to be located to a desired track.

Figure 2:
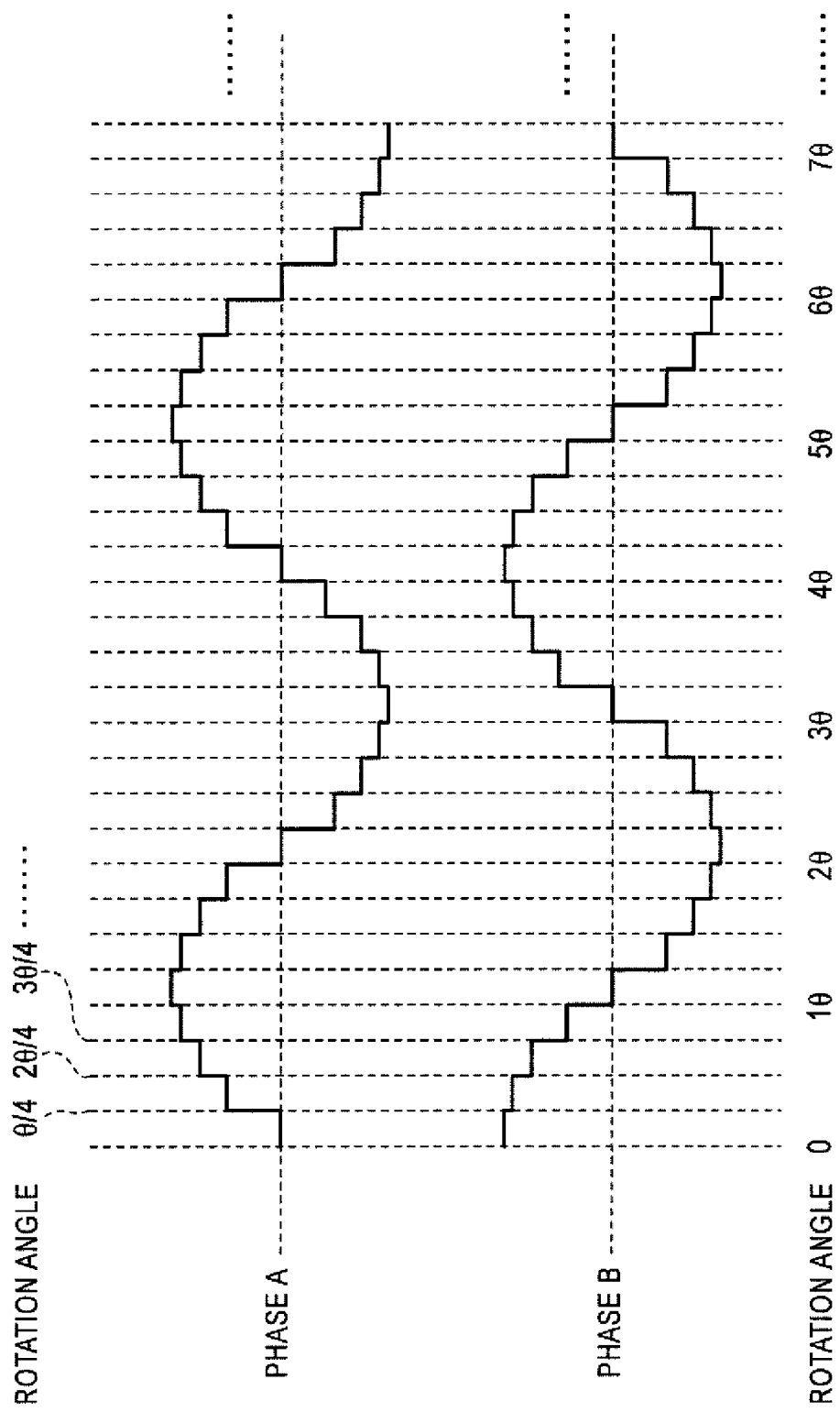
FIG. 2 is a block diagram showing an example of a microstep drive signal for a stepping motor.

FIG. 2 is a graph showing an example of a relationship between a microstep drive signal output from the microstep drive unit 132 and the rotation angle of the stepping motor 6. In the illustrated example, a two-phase stepping motor is used as the stepping motor 6 and the microstep division number thereof is set to 4.

In this case, the microstep drive signal serves as a phase-A current signal and a phase-B current signal. The horizontal axis of the graph indicates the mechanical rotation angle of the stepping motor 6. The phase-A current signal has a four-step waveform per one basic step angle of a sine wave, one cycle thereof having four basic step angles. The phase-B current signal has a four-step waveform per one basic step angle of a cosine wave, one cycle thereof having four basic step angles.

In FIG. 2, θ indicates a basic step angle of the stepping motor 6. In this case, since the microstep division number is 4, one microstep angle is θ/4.

Next, a description will be given of feed control processing, performed by the stepping-motor control unit 131 of the feed control unit 13, for controlling the rotation of the stepping motor 6 in accordance with the traverse signal TRVS.

Figure 3:
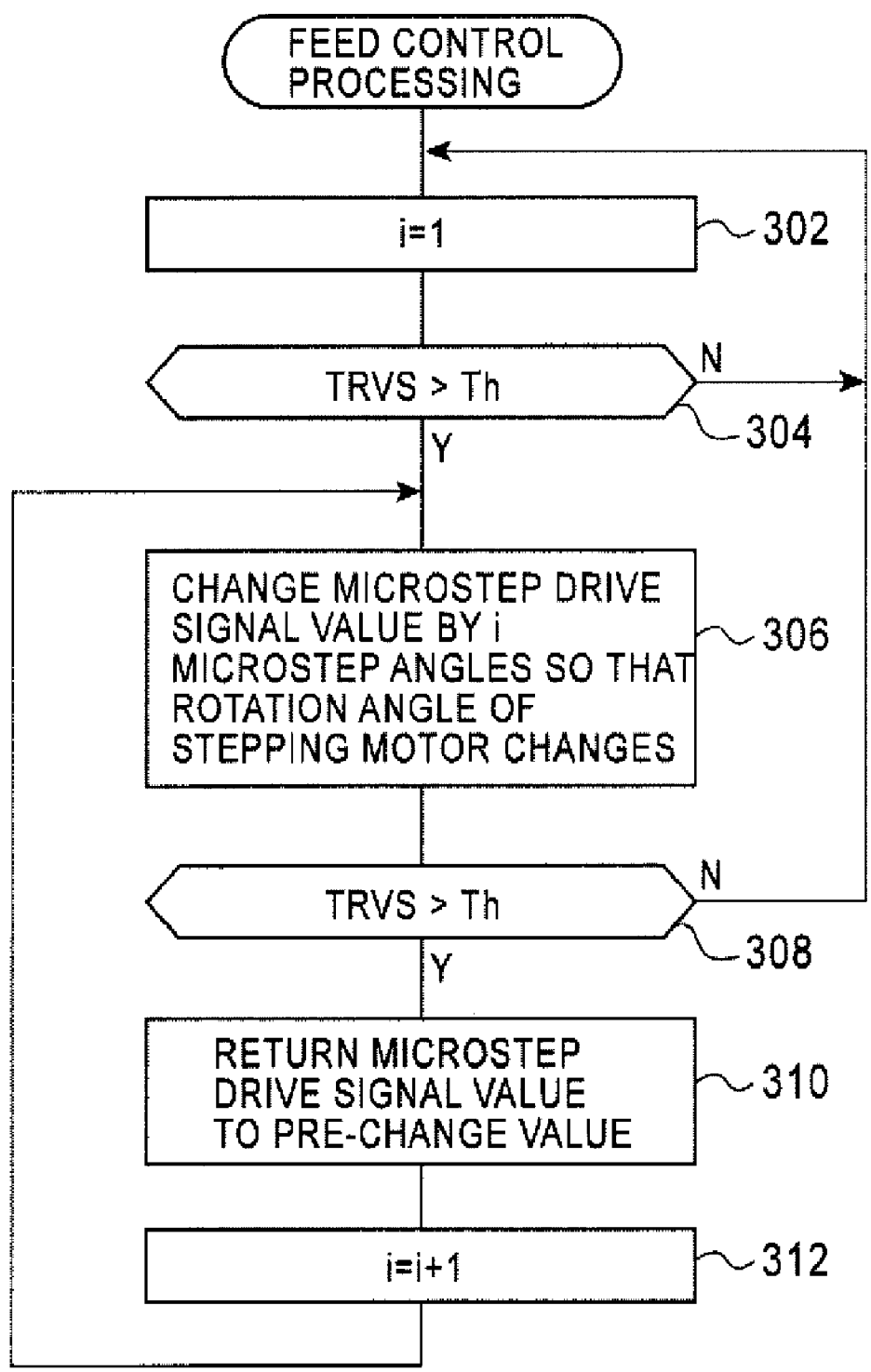
FIG. 3 is a flowchart showing feed control processing according to the embodiment of the present invention.

FIG. 3 shows a procedure of the feed control processing. As shown in FIG. 3, in this processing, in step 302, the stepping motor control unit 131 sets a variable i to 1. In step 304, the stepping-motor control unit 131 monitors whether or not the magnitude of the traverse signal TRVS exceeds a predetermined level Th.

When the magnitude of the traverse signal TRVS exceeds the predetermined level Th, in step 306, the stepping-motor control unit 13 causes the microstep drive unit 132 to change the value of the microstep drive signal so that the rotation angle of the stepping motor 6 changes by i microstep angle(s) in a rotation direction in which the magnitude of the traverse signal TRVS decreases. In this case, the rotation direction in which the magnitude of the traverse signal TRVS decreases is typically the rotation direction of the stepping motor 6 in which the sled 5 is advanced along a direction in which the spiral track advances (typically, toward the outer circumference of the optical disk 100).

In step 308, the stepping-motor control unit 131 determines whether or not the stepping motor 6 has rotated by checking whether or not the magnitude of the traverse signal TRVS changed to the predetermined level Th or less. When the magnitude of the traverse signal TRVS change s to the predetermined level Th or less, the process returns to the processing of step 302.

On the other hand, when the magnitude of the traverse signal TRVS does not change to the predetermined level Th or less, in step 310, the stepping-motor control unit 131 causes the microstep drive unit 132 to return the value of the microstep drive signal to the value before changing the value of the microstep drive signal in step 306 described above. In step 312, the stepping-motor control unit 131 increments i by 1. Subsequently, the process returns to step 306, and with respect to the increased i, the stepping-motor control unit 131 causes the microstep drive unit 132 to change the value of the microstep drive signal so that the rotation angle of the stepping motor 6 changes by i microstep angle(s) in the rotation direction in which the traverse signal TRVS decreases. Thereafter, the processing in step 308 and the subsequent steps is performed as described above.

Figure 4A:
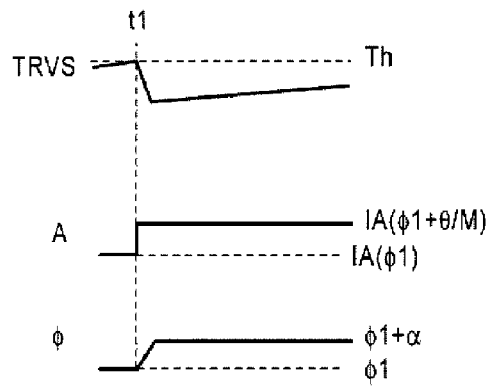
FIGS. 4A to 4D show examples of the feed control processing according to the embodiment of the present invention.
Figure 4B:
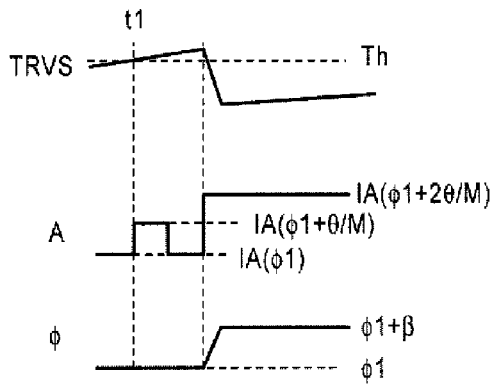
Figure 4C:
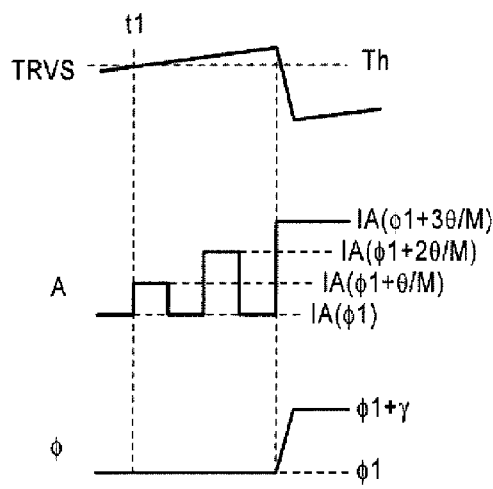

Examples of the feed control processing performed by the stepping-motor control unit 131 will now be described with reference to FIGS. 4A, 4B, and 4C. In this case, since the phase-A current signal A and the phase-B current signal B of the microstep drive signal for the stepping motor 6 are controlled in the same manner, FIGS. 4A, 4B, and 4C show only the waveform of the phase-A current signal A as a representative example.

A processing example shown in FIG. 4A will be described first. In this processing example, when the magnitude of the traverse signal TRVS exceeds the predetermined level Th at time t1, the stepping-motor control unit 131 changes the values of the phase-A current signal A and the phase-B current signal B from the present values $IA(\phi1)$ and $IB(\phi1)$ to values $IA(\phi1+\theta/M)$ and $IB(\phi1+\theta/M)$ corresponding to a rotation angle $\phi1+\theta M$. In accordance with the relationship shown in FIG. 2, the angle $\phi+1+\theta M$ is obtained by advancing the rotation angle of the stepping motor 6 by one microstep angle $\theta/M$ from the present rotation angle $\phi1$ in a rotation direction in which the magnitude of the traverse signal TRVS decreases. θ indicates the basic step angle and M indicates the microstep division number.

When the rotation angle θ of the stepping motor 6 changes to $\phi1+\alpha$ in response to the changes in the phase-A current signal A and the phase-B current signal B and the magnitude of the traverse signal TRVS becomes the predetermined level Th or less, the stepping-motor control unit 131 finishes the processing sequence for the change by which the magnitude of the present traverse signal TRVS exceeds the predetermined level Th, and waits for a change by which the magnitude of a next traverse signal TRVS exceeds the predetermined level Th. Depending on the state of the load of the stepping motor 6 and so on at the point, the value of α varies.

A processing example shown in FIG. 4B will be described next. In this processing example, when the magnitude of the traverse signal TRVS exceeds the predetermined level Th at time t1, the stepping-motor control unit 131 changes the values of the phase-A current signal A and the phase-B current signal B from the present values IA($\phi$1) and IB($\phi$1) to values IA($\phi$1+$\theta$/M) and IB($\phi$1+$\theta$/M) corresponding to a rotation angle $\phi$1+$\theta$/M. In accordance with the relationship shown in FIG. 2, the angle $\phi$1+$\theta$/M is obtained by advancing the rotation angle of the stepping motor 6 by one microstep angle $\theta$/M from the present rotation angle $\phi$ in a rotation direction in which the magnitude of the traverse signal TRVS decreases.

When the rotation angle $\theta$ of the stepping motor 6 does not change in response to the changes in the phase-A current signal A and the phase-B current signal B and the magnitude of the traverse signal TRVS does not become the predetermined level Th or less, the stepping-motor control unit 131 temporarily returns the values of the phase-A current signal A and the phase-B current signal B to the pre-change values IA($\phi$1) and IB($\phi$1).

Next, the stepping-motor control unit 131 changes the values of the phase-A current signal A and the phase-B current signal B from the present values IA($\phi$1) and IB($\phi$1) to values IA($\phi$1+2$\theta$/M) and IB($\phi$1+2$\theta$/M) corresponding to a rotation angle $\phi$1+$\theta$2/M. In accordance with the relationship shown in FIG. 2, the angle $\phi$1+2$\theta$/M is obtained by advancing the rotation angle of the stepping motor 6 by two microstep angles 2$\theta$/M from the present rotation angle $\phi$1 in a rotation direction in which the magnitude of the traverse signal TRVS decreases.

When the rotation angle $\theta$ of the stepping motor 6 changes to $\phi$1+$\beta$ in response to the changes in the phase-A current signal A and the phase-B current signal B and the magnitude of the traverse signal TRVS becomes the predetermined level Th or less, the stepping-motor control unit 131 finishes the processing sequence for the change by which the magnitude of the present traverse signal TRVS exceeds the predetermined level Th, and waits for a change by which the magnitude of a next traverse signal TRVS exceeds the predetermined level Th. Depending on the state of the load of the stepping motor 6 and so on at the point, the value of $\beta$ varies.

A processing example shown in FIG. 4C will be described next.

In this processing example, when the magnitude of the traverse signal TRVS exceeds the predetermined level Th at time t1, the stepping-motor control unit 131 changes the values of the phase-A current signal A and the phase-B current signal B from the present values IA($\phi$1) and IB($\phi$1) to values IA($\phi$1+$\theta$/M) and IB($\phi$1+$\theta$/M) corresponding to a rotation angle $\phi$1+$\theta$/M. In accordance with the relationship shown in FIG. 2, the angle $\phi$1+$\theta$/M is obtained by advancing the rotation angle of the stepping motor 6 by one microstep angle $\theta$/M from the present rotation angle $\phi$1 in a rotation direction in which the magnitude of the traverse signal TRVS decreases.

When the rotation angle $\theta$ of the stepping motor 6 does not change in response to the changes in the phase-A current signal A and the phase-B current signal B and the magnitude of the traverse signal TRVS does not become the predetermined level Th or less, the stepping-motor control unit 131 temporarily returns the values of the phase-A current signal A and the phase-B current signal B to the pre-change values IA($\phi$1) and IB($\phi$1).

Next, the stepping-motor control unit 131 changes the values of the phase-A current signal A and the phase-B current signal B from the present values IA($\phi$1) and IB($\phi$1) to values IA($\phi$1+2$\theta$/M) and IB($\phi$1+2$\theta$/M) corresponding to a rotation angle $\phi$1+$\theta$2/M. In accordance with the relationship shown in FIG. 2, the angle $\phi$1+2$\theta$/M is obtained by advancing the rotation angle of the stepping motor 6 by two microstep angles 2$\theta$/M from the present rotation angle $\phi$1 in a rotation direction in which the magnitude of the traverse signal TRVS decreases.

Even in this processing, when the rotation angle $\theta$ of the stepping motor 6 does not change in response to the changes in the phase-A current signal A and the phase-B current signal B and the magnitude of the traverse signal TRVS does not become the predetermined level Th or less, the stepping-motor control unit 131 returns the values of the phase-A current signal A and the phase-B current signal B to the pre-change values IA($\phi$1) and IB($\phi$1) again.

Then, the stepping-motor control unit 131 changes the values of the phase-A current signal A and the phase-B current signal B from the present values IA($\phi$1) and IB($\phi$1) to values IA($\phi$1+3$\theta$/M) and IB($\phi$1+3$\theta$/M) corresponding to a rotation angle $\phi$1+$\theta$3/M. In accordance with the relationship shown in FIG. 2, the angle $\phi$1+3$\theta$/M is obtained by advancing the rotation angle of the stepping motor 6 by three microstep angles 3$\theta$/M from the present rotation angle $\phi$1 in a rotation direction in which the magnitude of the traverse signal TRVS decreases.

When the rotation angle $\theta$ of the stepping motor 6 changes to $\phi$1+$\gamma$ in response to the changes in the phase-A current signal A and the phase-B current signal B and the magnitude of the traverse signal TRVS becomes the predetermined level Th or less, the stepping-motor control unit 131 finishes the processing sequence for the change by which the magnitude of the present traverse signal TRVS exceeds the predetermined level Th, and waits for a change by which the magnitude of a next traverse signal TRVS exceeds the predetermined level Th. Depending on the state of the load of the stepping motor 6 and so on at the point, the value of $\gamma$ varies.

Figure 4D:
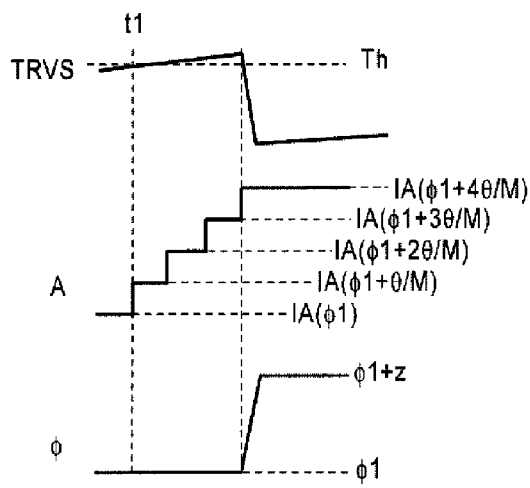

Processing examples of the feed control processing performed by the stepping-motor control unit 131 have been described above. In the feed control processing according to the present embodiment, the stepping-motor control unit 131 repeats returning the value of the microstep drive signal to the pre-change value and changing the value of the microstep drive signal while increasing the amount of change in the microstep drive signal until the stepping motor 6 rotates. With this processing, the force on the rotor of the stepping motor 6 increases gradually each time the magnitude of the microstep drive signal is changed. Thus, for example, as shown in FIG. 4D, when the stepping motor 6 does not rotate in response to a change in the microstep drive signal, it is possible to quickly and reliably rotate the stepping motor 6 compared to a case in which the microstep drive signal is increased by an amount corresponding to one microstep angle $\theta$/M, that is, a case in which the force on the rotor of the stepping motor 6 is the same each time the magnitude of the microstep drive signal is changed. In the processing according to the present invention, since the microstep drive signal is always changed after the value of the microstep drive signal is returned to the pre-change value, it is possible to reduce the amount of displacement relative to an intended rotation angle of the stepping motor 6 when the stepping motor 6 rotates.

With the microstep division number being set to a large value, when the stepping motor 6 does not rotate in response to a change in the microstep drive signal and the servo control does not work, the operation can be quickly returned to a state in which appropriate servo control is performed. With this arrangement, it is possible to improve the accuracy of the servo control, with the microstep division number being set to a large value.

In the above described embodiment, when the stepping motor 6 does not rotate in response to a change in the microstep drive signal, returning the value of the microstep drive signal to the pre-change value and changing the microstep drive signal are repeated while the amount of change in the microstep drive signal is increased until the stepping motor 6 rotates. The technology for the microstep driving of the stepping motor 6 is applicable to not only the stepping motor 6 used for feeding of the pickup 4 of the optical-disk drive but also the servo control of the stepping motor 6 used for an arbitrary application. In such a case, whether or not the stepping motor 6 rotates may be detected by directly detecting the rotation of the stepping motor 6 or may be detected in accordance with an arbitrary state that varies in conjunction with the rotation of the stepping motor 6.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk playback apparatus for playing back a storage-medium disk, the disk playback apparatus comprising:
   a pickup that reads a signal from the disk;
   a stepping motor that moves the pickup in a radial direction of the disk;
   a drive control unit that (i) detects whether or not rotation of the stepping motor for moving the pickup in a radial direction of the disk is required for tracking of the pickup, and (ii) performs a basic driving step of performing microstep driving for changing a rotation angle of the stepping motor by changing a value of a drive signal to be supplied to the stepping motor, when it is determined that the rotation is required; and
   a servo control unit that performs tracking servo of the pickup by controlling the drive control unit,
   wherein, when the drive control unit performs the microstep driving in accordance with control of the servo control unit and the stepping motor does not rotate, the drive control unit returns the value of the drive signal to a pre-change value and changes the value of the drive signal by an amount of change that is greater than an amount of change in the drive signal that was supplied when the stepping motor did not rotate.

2. The disk playback apparatus according to claim 1, wherein, when the drive control unit performs the microstep driving in accordance with control of the servo control unit and the stepping motor again does not rotate, the drive control unit repeats returning the value of the drive signal to the pre-change value and changing the value of the microstep drive signal while increasing the amount of change in the value of the drive signal, until the stepping motor rotates.

3. The disk playback apparatus according to claim 2, wherein, when the drive control unit performs the microstep driving in accordance with control of the servo control unit so that the rotation angle of the stepping motor changes by an amount corresponding to one microstep angle and the stepping motor does not rotate, the drive control unit repeatedly returns the value of the drive signal to the pre-change value and repeats the operation for changing the value of the drive signal so that the rotation angle of the stepping motor changes by an amount corresponding to i microstep angles while incrementing i by one from two until the stepping motor rotates, one microstep angle being obtained by dividing a basic step angle of the stepping motor by the number of microsteps per one basic step of the stepping motor.

4. The disk playback apparatus according to claim 1, wherein, when the drive control unit performs the microstep driving in accordance with control of the servo control unit so that the rotation angle of the stepping motor changes by an amount corresponding to one microstep angle and the stepping motor does not rotate, the drive control unit returns the value of the drive signal to the pre-change value and changes the value of the drive signal so that the rotation angle of the stepping motor changes by an amount corresponding to two microstep angles, one microstep angle being obtained by dividing a basic step angle of the stepping motor by the number of microsteps per one basic step of the stepping motor.

5. The disk playback apparatus according to claim 1, wherein the disk comprises an optical disk.

6. The disk playback apparatus according to claim 1, wherein, based on a tracking error signal indicating an amount of tracking error of the pickup, the drive control unit determines whether or not the stepping motor rotates when the value of the drive signal is changed to change the rotation angle of the stepping motor.

7. A stepping-motor control apparatus for performing servo control of a stepping motor comprising:
   a drive control unit that (i) detects whether or not rotation of the stepping motor is required, and (ii) performs a basic driving step of performing microstep driving for changing a rotation angle of the stepping motor by changing a value of a drive signal to be supplied to the stepping motor, when it is determined that the rotation is required;
   a servo control unit that performs servo control of the stepping motor by controlling the drive control unit;
   wherein, when the drive control unit performs the microstep driving in accordance with control of the servo control unit and the stepping motor does not rotate, the drive control unit returns the value of the drive signal to a pre-change value and changes the value of the drive signal by an amount of change that is greater than the amount of change in the drive signal that was supplied when the stepping motor did not rotate.

8. The stepping-motor control unit according to claim 7, wherein, when the drive control unit performs the microstep driving in accordance with control of the servo control unit and the stepping motor again does not rotate, the drive control unit repeats returning the value of the drive signal to the pre-change value and changing the value of the microstep drive signal while increasing the amount of change in the value of the drive signal, until the stepping motor rotates.

9. The stepping-motor control apparatus according to claim 8, wherein, when the drive control unit performs the microstep driving in accordance with control of the servo control unit so that the rotation angle of the stepping motor changes by an amount corresponding to one microstep angle and the stepping motor does not rotate, the drive control unit repeatedly returns the value of the drive signal to the pre-change value and repeats the operation for changing the value of the drive signal so that the rotation angle of the stepping motor changes by an amount corresponding to i microstep angles while incrementing i by one from two until the stepping motor rotates, one microstep angle being obtained by dividing a basic step angle of the stepping motor by the number of microsteps per one basic step of the stepping motor.

10. The stepping-motor control apparatus according to claim 7, wherein, when the drive control unit performs the microstep driving in accordance with control of the servo control unit so that the rotation angle of the stepping motor changes by an amount corresponding to one microstep angle and the stepping motor does not rotate, the drive control unit returns the value of the drive signal to the pre-change value and changes the value of the drive signal so that the rotation angle of the stepping motor changes by an amount corresponding to two microstep angles, one microstep angle being obtained by dividing a basic step angle of the stepping motor by the number of microsteps per one basic step of the stepping motor.

11. A tracking-servo control method for a disk playback apparatus for playing back a recording-medium disk, the method performing tracking servo of a pickup for reading a signal from the disk, the method comprising:
   a rotation requirement/non-requirement detecting step of detecting whether or not rotation of the stepping motor for moving the pickup in a radial direction of the disk is required for tracking of the pickup;
   a drive controlling step of performing microstep driving for changing the rotation angle of the stepping motor by changing the value of the drive signal to be supplied to the stepping motor, when it is determined in the rotation requirement/non-requirement detection step that the rotation is required,
   wherein the drive control step comprises:
   a basic driving step of performing microstep driving for changing the rotation angle of the stepping motor by changing the value of the drive signal; and
   a recovering step of returning, when the value of the drive signal is changed in the basic driving step and the stepping motor does not rotate, the value of the drive signal to a pre-change value and changing the value of the drive signal by an amount of change that is greater than the amount of change in the drive signal that was supplied when the stepping motor did not rotate.

12. The tracking-servo control method according to claim 11, wherein, when the value of the drive signal is changed in the basic driving step and the stepping motor again does not rotate, returning the value of the drive signal to the pre-change value and changing the value of the microstep drive signal are repeated while the amount of change in the value of the drive signal is increased, until the stepping motor rotates.

13. The tracking-servo control method according to claim 12, wherein the microstep driving is performed in accordance with control of the servo control unit so that the rotation angle of the stepping motor changes by an amount corresponding to one microstep angle and the stepping motor does not rotate, one microstep angle being obtained by dividing a basic step angle of the stepping motor by the number of microsteps per one basic step of the stepping motor; and
   when the value of the drive signal is changed in the basic driving step and the stepping motor does not rotate, in the recovering step, the value of the drive signal repeatedly is returned to the pre-change value and the operation for changing the value of the drive signal is repeated so that the rotation angle of the stepping motor changes by an amount corresponding to i microstep angles while i is incremented by one from two until the stepping motor rotates.

14. The tracking-servo control method according to claim 11, wherein the microstep driving is performed in the basic driving step in accordance with control of the servo control unit so that the rotation angle of the stepping motor changes by an amount corresponding to one microstep angle, one microstep angle being obtained by dividing a basic step angle of the stepping motor by the number of microsteps per one basic step of the stepping motor; and
   when the value of the drive signal is changed in the basic driving step and the stepping motor does not rotate, in the recovering step, the value of the drive signal is returned to the pre-change value and the value of the drive signal is changed so that the rotation angle of the stepping motor changes by an amount corresponding to two microstep angles.

15. The tracking-servo control method according to claim 11, wherein the disk comprises an optical disk.

16. The tracking-servo control method according to claim 11, wherein in the recovering step, based on a tracking error signal indicating an amount of tracking error of the pickup, a determination is made as to whether or not the stepping motor rotates when the value of the drive signal is changed to change the rotation angle of the stepping motor.

17. A stepping-motor control method for performing servo control of a stepping motor:
   a rotation requirement/non-requirement detecting step of detecting whether or not rotation for the servo control of the pickup is required;
   a drive controlling step of performing microstep driving for changing a rotation angle of the stepping motor by changing a value of a drive signal to be supplied to the stepping motor, when it is determined in the rotation requirement/non-requirement detecting step that the rotation is required,
   wherein the drive controlling step comprises:
   a basic driving step of performing microstep driving for changing the rotation angle of the stepping motor by changing the value of the drive signal; and
   a recovering step of returning, when the value of the drive signal is changed in the basic driving step and the stepping motor does not rotate, the value of the drive signal to a pre-change value and changing the value of the drive signal by an amount of change that is greater than the amount of change in the drive signal that was supplied when the stepping motor did not rotate.

18. The stepping-motor control method according to claim 17, wherein, when the value of the drive signal is changed in the basic driving step and the stepping motor does not rotate, in the recovering step, returning the value of the drive signal to the pre-change value and changing the microstep drive signal are repeated while the amount of change in the value of the drive signal is increased, until the stepping motor rotates.

19. The stepping-motor control method according to claim 18, wherein the microstep driving is performed in accordance with control of the servo control unit in the basic driving step so that the rotation angle of the stepping motor changes by an amount corresponding to one microstep angle, one microstep angle being obtained by dividing a basic step angle of the stepping motor by the number of microsteps per one basic step of the stepping motor; and
   when the value of the drive signal is changed in the basic driving step and the stepping motor does not rotate, in the recovering step, the value of the drive signal repeatedly is returned to the pre-change value and the operation for changing the value of the drive signal is performed so that the rotation angle of the stepping motor changes by an amount corresponding to i microstep angles while i is incremented by one from two until the stepping motor rotates.

20. The stepping-motor control method according to claim 17, wherein, the microstep driving is performed in accordance with control of the servo control unit in the basic driving step so that the rotation angle of the stepping motor changes by an amount corresponding to one microstep angle, one microstep angle being obtained by dividing a basic step angle of the stepping motor by the number of microsteps per one basic step of the stepping motor; and when the value of the drive signal is changed in the basic driving step and the stepping motor does not rotate, in the recovering step, the value of the drive signal is returned to the pre-change value and the value of the drive signal is changed so that the rotation angle of the stepping motor changes by an amount corresponding to two microstep angles.

* * * * *